(12) United States Patent  
Anschutz et al.

(10) Patent No.: US 7,933,285 B2  
(45) Date of Patent: Apr. 26, 2011

(54) DISTRIBUTED DIGITAL SUBSCRIBER LINE ACCESS MULTIPLEXERS TO INCREASE BANDWIDTH IN ACCESS NETWORKS

(75) Inventors: Thomas Anschutz, Conyers, GA (US); Zhi Cui, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 244 days.

(21) Appl. No.: 12/257,858

(22) Filed: Oct. 24, 2008

(65) Prior Publication Data

US 2010/0103947 A1 Apr. 29, 2010

(51) Int. Cl.  
*H04J 1/02* (2006.01)  
*H04J 1/12* (2006.01)  
*H04Q 1/02* (2006.01)

(52) U.S. Cl. ........ 370/420; 370/201; 370/430; 370/493; 709/224

(58) Field of Classification Search .......... 370/241–254, 370/286–352, 389–469; 709/224–229  
See application file for complete search history.

(56) References Cited

U.S. PATENT DOCUMENTS

| | | |
|---|---|---|
| 4,540,846 A | 9/1985 | Smith |
| 4,768,188 A | 8/1988 | Barnhart et al. |
| 5,150,246 A | 9/1992 | Kimball et al. |
| 5,523,869 A | 6/1996 | Still et al. |
| 5,699,176 A | 12/1997 | Cohen |
| 5,729,370 A | 3/1998 | Bernstein et al. |
| 5,793,410 A | 8/1998 | Rao |
| 6,026,144 A | 2/2000 | Bernstein et al. |
| 6,031,300 A | 2/2000 | Moran |
| 6,144,998 A * | 11/2000 | Pisterzi .......... 725/109 |
| 6,160,946 A | 12/2000 | Thompson et al. |
| 6,385,030 B1 | 5/2002 | Beene |
| 6,389,030 B1 | 5/2002 | Coden |
| 6,427,035 B1 | 7/2002 | Mahony |

(Continued)

FOREIGN PATENT DOCUMENTS

CN 101001120 7/2007

(Continued)

OTHER PUBLICATIONS

Reconfigurable Optical Add-Drop Multiplexer, Wikipedia web page http://en.wikipedia.org/wiki/Reconfigurable_optical_add-drop_multiplexer, Oct. 13, 2008, 1 page.

(Continued)

*Primary Examiner* — Man Phan  
(74) *Attorney, Agent, or Firm* — Hanley, Flight & Zimmerman, LLC

(57) ABSTRACT

Example distributed DSLAMs to increase bandwidth in access networks are disclosed. An example DSLAM comprises a first distribution cable segment to couple an SAI to a first pedestal and to transport user data, a second distribution cable segment to couple the first pedestal to a second pedestal and to transport a first portion of the user data from the first pedestal to the second pedestal, the second cable segment comprising a pair of DSL-based signals bonded together, a drop cable to couple the first pedestal to a customer premises and to transport a second portion of the user data to the customer premises, and a switch at the first pedestal to route the first portion of the user data between the first and second cable segments and to route the second portion of the user data between the first cable segment and the drop cable.

26 Claims, 2 Drawing Sheets

U.S. PATENT DOCUMENTS

| | | | |
|---|---|---|---|
| 6,454,597 | B1 | 9/2002 | Marsh et al. |
| 6,577,414 | B1 | 6/2003 | Feldman et al. |
| 6,665,319 | B1 | 12/2003 | Bergaire et al. |
| 6,738,983 | B1 | 5/2004 | Rao et al. |
| 6,785,265 | B2 * | 8/2004 | White et al. .......... 370/352 |
| 6,842,845 | B2 | 1/2005 | Ganapathy et al. |
| 6,886,181 | B1 | 4/2005 | Dodds et al. |
| 7,006,497 | B2 | 2/2006 | Dove et al. |
| 7,006,500 | B1 * | 2/2006 | Pedersen et al. .......... 370/394 |
| 7,007,297 | B1 | 2/2006 | Woodward |
| 7,095,958 | B1 | 8/2006 | Woodward |
| 7,133,441 | B1 | 11/2006 | Barlev et al. |
| 7,139,484 | B2 | 11/2006 | Kurumida et al. |
| 7,274,881 | B2 | 9/2007 | Hochbaum |
| 7,278,152 | B1 | 10/2007 | Rao |
| 7,278,158 | B2 | 10/2007 | Peretti |
| 7,356,042 | B2 | 4/2008 | Ethridge et al. |
| 7,366,203 | B2 | 4/2008 | Deas |
| 7,376,191 | B2 | 5/2008 | Melick et al. |
| 7,606,218 | B2 * | 10/2009 | White et al. .......... 370/352 |
| 7,751,388 | B2 * | 7/2010 | White et al. .......... 370/352 |
| 2002/0101851 | A1 * | 8/2002 | Blake et al. .......... 370/352 |
| 2003/0200549 | A1 | 10/2003 | Rao et al. |
| 2004/0076166 | A1 | 4/2004 | Patenaude |
| 2004/0165889 | A1 | 8/2004 | Mahony et al. |
| 2004/0175173 | A1 | 9/2004 | Deas |
| 2004/0264683 | A1 | 12/2004 | Bye |
| 2005/0152385 | A1 | 7/2005 | Cioffi |
| 2006/0077891 | A1 | 4/2006 | Smith et al. |
| 2006/0153517 | A1 | 7/2006 | Reagan et al. |
| 2006/0153565 | A1 | 7/2006 | Park et al. |
| 2006/0171714 | A1 | 8/2006 | Dove |
| 2006/0251094 | A1 | 11/2006 | Van Vleck et al. |
| 2006/0275036 | A1 | 12/2006 | Hochbaum et al. |
| 2007/0019956 | A1 | 1/2007 | Sorin et al. |
| 2007/0030856 | A1 * | 2/2007 | Cooke et al. .......... 370/401 |
| 2007/0230955 | A1 | 10/2007 | Miller et al. |
| 2008/0011990 | A1 | 1/2008 | Kostet et al. |
| 2008/0019501 | A1 | 1/2008 | Miller, III et al. |
| 2008/0046938 | A9 | 2/2008 | Rao et al. |
| 2008/0063399 | A1 * | 3/2008 | Mallya et al. .......... 398/75 |
| 2008/0069004 | A1 | 3/2008 | Huff |
| 2008/0141320 | A1 * | 6/2008 | McCarthy et al. .......... 725/110 |
| 2008/0152350 | A1 * | 6/2008 | Sheng .......... 398/140 |
| 2008/0193130 | A1 | 8/2008 | Chae et al. |
| 2008/0253769 | A1 | 10/2008 | Liu |
| 2008/0290729 | A1 | 11/2008 | Schoenberg et al. |
| 2009/0010657 | A1 | 1/2009 | Kazutaka |
| 2010/0094989 | A1 * | 4/2010 | Li et al. .......... 709/224 |
| 2010/0149999 | A1 * | 6/2010 | Beattie et al. .......... 370/249 |

FOREIGN PATENT DOCUMENTS

| | | |
|---|---|---|
| EP | 1018851 | 12/2000 |
| JP | 2007295506 | 11/2007 |
| KR | 713062 | 4/2007 |
| WO | 2008/007884 | 1/2008 |

OTHER PUBLICATIONS

Passive Optical Network, Wikipedia web page http://en.wikipedia.org/wiki/Passive_optical_network, Oct. 14, 2008, 7 pages.

Cioffi et al., CuPon: The Copper Alternative to PON 100 Gb/s DSL Networks, IEEE Communications Magazine, Jun. 2007, 8 pages.

Dynamic Spectrum Management (DSM): Level 3—Vectoring for multi-100 Mbps DSLs, Birds of a Feather Session, DSL Forum, Speaker John M. Cioffi, Aug. 28, 2007, 18 pages.

James Blanc, Pedestal Networks, Inc., Line Powering in the Remote DSLAM World, CommsDesign, Dec. 7, 2004, 9 pages.

Optical add-drop multiplexer, Wikipedia web page http://en.wikipedia.org./wiki/Optical_add-drop_multiplexer, Jan. 31, 2008, 2 pages.

Extending Asymmetric Digital Subscriber Line (ADSL) Services to Remote Digital Loop Carrier (DLC) Locations, Web ProForums, web page http://www.iec.org/online/tutorials/adsl_dlc/topic04.html, Copyright 2007, printed Oct. 15, 2008, 2 pages.

Fiber to the X, Wikipedia web page http://en.wikipedia.org/wiki/Fiber_to_the_x, Oct. 14, 2008, 8 pages.

Hui, Rongqing, et al. "Subcarrier Multiplexing for High-Speed Optical Transmission," Journal of Lightwave Technology, vol. 20, No. 3, Mar. 2002, pp. 417-427 (11 pages).

* cited by examiner

DISTRIBUTED DIGITAL SUBSCRIBER LINE ACCESS MULTIPLEXERS TO INCREASE BANDWIDTH IN ACCESS NETWORKS

FIELD OF THE DISCLOSURE

This disclosure relates generally to access networks and, more particularly, to distributed digital subscriber line (DSL) access multiplexers (DSLAMs) to increase bandwidth in access networks.

BACKGROUND

Communication systems using DSL technologies are commonly utilized to provide communication services to customer premises. DSL technologies enable service providers to utilize telephone lines to connect customers to, for example, a high data-rate broadband Internet network, a broadband service and/or broadband content. An example telephone line uses twisted-pair copper wire to provide Plain Old Telephone System (POTS) services. A communication company and/or service provider may utilize a plurality of DSL modems implemented by a DSLAM at a central office (CO), a remote terminal (RT) or a serving area interface (SAI) to provide DSL communication services to a plurality of customer-premises DSL modems located at respective customer premises. In general, a DSLAM receives broadband service content for a subscriber from, for example, a backbone server. A CO DSL modem at the DSLAM forms from the content a downstream DSL signal to be transmitted to a customer-premises DSL modem via a telephone line that electrically couples the CO DSL modem at the SAI, RT or CO to the customer-premises DSL modem. Likewise, the CO DSL modem receives an upstream DSL signal from the customer-premises DSL modem via the corresponding subscriber's telephone line, and the DSLAM provides the data received via the upstream DSL signal to the backbone server.

DETAILED DESCRIPTION

Figure 1:
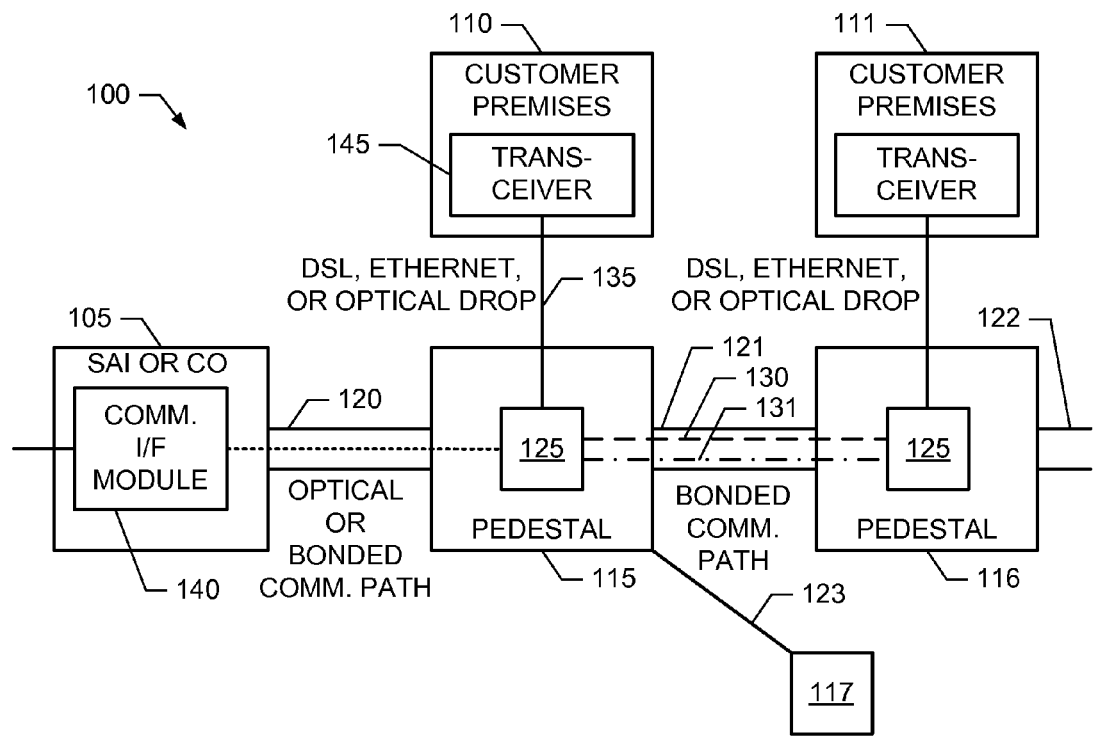
FIG. 1 is a schematic illustration of an example distributed DSLAM constructed in accordance with the teachings of this disclosure.

Example distributed digital subscriber line (DSL) access multiplexers (DSLAMs) to increase bandwidth in access networks are disclosed. A disclosed example distributed DSLAM includes a first distribution cable segment to couple a serving area interface (SAI) to a first pedestal, the first distribution cable segment to transport user data associated with a plurality of subscribers served by the SAI, a second distribution cable segment to couple the first pedestal to a second pedestal, the second distribution cable segment to transport a first portion of the user data associated with a first of the plurality of subscribers from the first pedestal to the second pedestal, the second distribution cable segment comprising a pair of DSL-based signals bonded together to form a bonded communication path, the second distribution cable segment different from the first distribution cable segment, a drop cable segment to couple the first pedestal to a customer premises, the drop cable segment to transport a second portion of the user data associated with a second of the plurality of subscribers to the customer premises, the drop cable segment different from the first and second distribution cable segments, and a switch at the first pedestal to route the first portion of the user data between the first and second distribution cable segments and to route the second portion of the user data between the first distribution cable segment and the drop cable segment.

A disclosed example access network includes an SAI to implement communication services for respective ones of a plurality of subscribers and first and second pedestals. The first pedestal comprising a first communication interface module to communicatively couple the first pedestal to the SAI via a first bonded communication path, the first bonded communication path comprising a first pair of bonded communication paths to transport user data associated with the plurality of subscribers served by the SAI, a second communication interface module to communicatively couple the first pedestal to a second bonded communication path, the second bonded communication path comprising a second pair of bonded communication paths to transport a first portion of the user data, a third communication interface module to communicatively couple the first pedestal to a first customer premises and to transport a second portion of the user data associated with a first of the plurality of subscribers to the first customer premises, and a first switch to route the first portion of the user data between the first and second communication interface modules and to route the second portion of the user data between the first and third communication interface modules. The second pedestal comprising a fourth communication interface module to communicatively couple the first pedestal to the second pedestal via the second bonded communication path, a fifth communication interface module to communicatively couple the second pedestal to a second customer premises and to transport a third portion of the user data associated with a second of the plurality of subscribers to the second customer premises, the second portion of the user data comprising the third portion of the user data, and a second switch to route the third portion of the user data between the fourth and fifth communication interface modules.

A disclosed example apparatus includes a first communication interface module at a first pedestal to receive user data associated with a plurality of subscribers served by an SAI via a first communication path, the first communication path implemented in a first cable segment, a second communication interface module at the first pedestal to transport a first portion of the user data to a second pedestal via a second communication path, the second communication path comprising a pair of communication paths bonded together to form a bonded communication path, the second communication path implemented in a second cable segment different from the first cable segment, a third communication interface module at the first pedestal to transport a second portion of the user data associated with a first of the plurality of subscribers to a customer premises, and a switch at the first pedestal to route the first portion of the user data between the first and second communication interface modules and to route the second portion of the user data between the first and third communication interface modules.

FIG. 1 illustrates an example distributed DSLAM 100 that may be used to implement an access network. In the illustrated example of FIG. 1, an SAI, a remote terminal (RT) or a central office (CO) 105 provides and/or implements communication services for one or more customer premises, two of which are designated at reference numerals 110 and 111. Example services include, but are not limited to, telephone services, Internet-based services, data services, messaging services, instant messaging services, electronic mail (email) services, chat services, video services, video on demand services, audio services, and/or gaming services.

The example SAI 105 of FIG. 1 provides the services to the example customer premises 110 and 111 via any number of interposed pedestals or aerial terminals, two of which are designated at reference numerals 115 and 116. To implement the example distributed DSLAM 100, the example SAI 105, the example pedestal 115 and the example pedestal 116 of FIG. 1 are configured in a daisy-chain topology. In particular, a first communication path 120 is used to communicatively couple the example SAI, RT or CO 105 to the example pedestal 115, and a second communication path 121 is used to communicatively couple the example pedestal 115 to the example pedestal 116, and a third communication path 122 is used to communicatively couple the example pedestal 116 to another pedestal (not shown). The example communication paths 120-122 of FIG. 1 are located in and/or implemented by different, separate and/or disjoint segments of F2 distribution cable. The example communication path 120 of FIG. 1 transports user data associated with all of the subscribers served by the pedestals 115 and 116. The example communication path 121 of FIG. 1 transports user data associated with all of the subscribers served by the pedestal 116 and any additional pedestals. The example communication path 122 of FIG. 1 transports user data associated with all of the subscribers served by any additional pedestals served by the SAI 105 via the communication path 120. In some examples, a pedestal (for example, the pedestal 115) is communicatively coupled to one or more additional pedestals, one of which is designated at reference numeral 117 via additional communication paths, one of which is designated at reference numeral 123. The example communication path 123 transports user data associated with all of the subscribers served via the pedestal 117.

To route data between the communication paths 120 and 121, and between the pedestals 115-116 and the customer premises 110-111, each of the example pedestals 115, 116 and 117 of FIG. 1 implements a pedestal-based distributor 125. As described below in connection with FIG. 2, each of the example pedestal-based distributors 125 of FIG. 1 includes a switch and/or hub 205 (FIG. 2) to repeat user data between and/or amongst any two of the communication paths 120-123, and to add and/or drop user data associated with the customer premises that are directly communicatively coupled to the pedestal-based distributor 125.

Because the distances between adjacent pedestals (for example, the pedestals 115 and 116), the example communication paths joining such adjacent pedestals (for example, the communication paths 121, 122 and 123) of FIG. 1 can be implemented to have high data-rates by bonding together two or more DSL-based or Ethernet-based signals. For example, a first telephone line 130 can be used to transport a first DSL-based signal, and a second telephone line 131 can be used to transport a second DSL-based signal. Communication interface modules 210 and 215 (FIG. 2) of the example pedestal-based distributors 125 can be used to aggregate, bond, join, and/or combine the first and second DSL-based signals 130 and 131 to form the higher data-rate communication path 121. That is, the example communication path 121 is a communication path comprising multiple physical signal paths 130 and 131 that each transport corresponding signals. The physical signal paths 130 and 131 are bonded and/or combined at, for example, the media access control (MAC) and/or data-link layer, to form a logical and/or composite communication path 121 having a transport capability that is substantially the collective data transport capacity of the underlying signal paths 130 and 131.

The example signals 130 and 131 of FIG. 1 can be implemented, for example, in accordance with any past, present and/or future standard, specification and/or recommendation related to the transmission of communication services via wires and/or telephone lines, such as any of the International Telecommunications Union-Telecommunications Sector (ITU-T) G.991.x family of recommendations for symmetric high-speed DSL (SHDSL), G.992.x family of recommendations for asymmetric DSL (ADSL), and/or G.993.x family of recommendations for very high-speed DSL (VDSL) and VDSL2, and/or any of the Institute of Electrical and Electronics Engineers (IEEE) 802.3x family of standards. Bonding of the example signals 130 and 131 can be implemented, for example, in accordance with any past, present and/or future standard, specification and/or recommendation related to bonding and/or link aggregation, such as any of the ITU-T G.998.x family of recommendations for bonding of DSL lines and/or the IEEE 802.3ad standard for link aggregation.

The example communication path 120 of FIG. 1 can be implemented in accordance with, for example, any past, present and/or future standard, specification and/or recommendation related to the transmission of communication services via fiber optic cables, such as any of the ITU-T G.984 recommendation for Gigabit-capable passive optical network (GPON) and/or the IEEE 802.3z 1000BASE-SX, 1000BASE-LX or 1000BASE-BX standards for Ethernet over fiber optic cable. Alternatively, the example communication path 120 can be implemented by bonding together two or more DSL-based and/or Ethernet-based signals (not shown) as described above in connection with the example communication paths 121 and 122, and/or point-to-point microwave signals. A communication interface module 140 at the SAI 105 and an upstream communication interface module 210 (FIG. 2) at the pedestal-based distributor 125 communicate optical signals and/or bonded signals via the example communication path 120.

By bonding together multiple signals 130 and 131 to form the communication paths 120, 121, 122 and/or 123, high-bandwidth communication services can be simultaneously provided to multiple customer premises 110 and 111 without the need to cause neighborhood and/or traffic disruptions, and/or to expend the time, labor and/or expense to lay fiber optic cable(s) to and/or between the SAI 105 and the pedestals 115 and 116. Instead, the example distributed DSLAM 100 of FIG. 1 takes advantage of already existing telephone wires 130 and 131 between adjacent pairs of the SAI 105 and the pedestals 115 and 116.

The example pedestals 115 and 116 of FIG. 1 provide communication services to the customer premises 110 and 111 via respective drop wires and/or cables, one of which is designated at reference numeral 135. Example drop wires and/or cables 135 include, but are not limited to, a telephone line, a co-axial cable and/or an optical cable. When a telephone line 135 is used, user data may be transported to and/or from the customer premises 110 using, for example, Ethernet-based and/or DSL-based signals implemented by a customer-premises equipment (CPE) device, a customer-premises transceiver, and/or a residential gateway 145 at the customer premises 110 and a CPE communication interface module 220 (FIG. 2) implemented at the pedestal-based distributor 125. Because Ethernet-based and/or DSL-based signals need only be transported over the length of the drop wire 135 rather than over the entire distance from the SAI 105 to the customer premises 110, high-bandwidth communication services can be provided to the customer premises 110 via the drop wire 135 without the need to cause property disruptions, and/or to expend the time, labor and/or expense to lay a fiber optic cable to and/or between the customer premises 110 and the pedestal 115. In the illustrated example of FIG. 1, a single drop wire 135 is used to transport user data between the pedestal 115 and the customer premise 110. However, multiple drop wires and/or bonding technologies could, additionally or alternatively, be used.

While an example distributed DSLAM 100 has been illustrated in FIG. 1, one or more of the interfaces, data structures, elements, processes and/or devices illustrated in FIG. 1 may be combined, divided, re-arranged, omitted, eliminated and/or implemented in any other way. Further, the example pedestal-based distributors 125, the example communication interface module 140 and/or the example transceiver 145 of FIG. 1 may be implemented by hardware, software, firmware and/or any combination of hardware, software and/or firmware. Thus, for example, any of the example pedestal-based distributors 125, the example communication interface module 140 and/or the example transceiver 145 may be implemented by one or more device(s), circuit(s), programmable processor(s), application specific integrated circuit(s) (ASIC(s)), programmable logic device(s) (PLD(s)) and/or field programmable logic device(s) (FPLD(s)), etc. Further still, a distributed DSLAM may include interfaces, data structures, elements, processes and/or devices instead of, or in addition to, those illustrated in FIG. 1 and/or may include more than one of any or all of the illustrated interfaces, data structures, elements, processes and/or devices.

Figure 2:
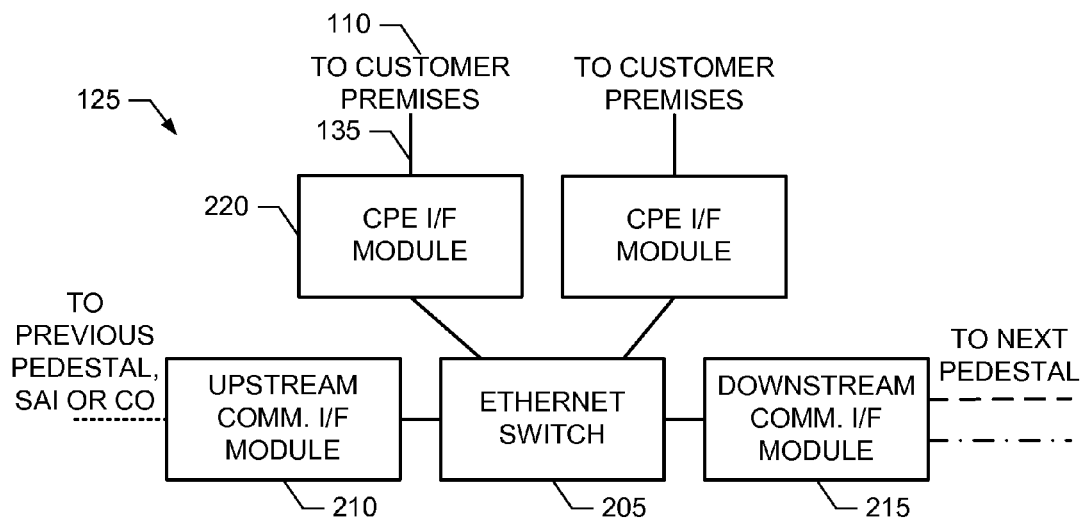
FIG. 2 illustrates an example manner of implementing a pedestal-based distributor for the example distributed DSLAM of FIG. 1.

FIG. 2 illustrates an example manner of implementing the example pedestal-based distributors 125 of FIG. 1. To communicatively couple the pedestal-based distributor 125 to a previous and/or upstream daisy-chained element of the example distributed DSLAM 100 of FIG. 1, the example pedestal-based distributor 125 of FIG. 2 includes the example upstream communication interface module 210. The previous daisy-chained element can be either (a) the SAI 105 when the pedestal 115-117 that implements the pedestal-based distributor 125 is the closest pedestal 115 to the SAI 105, or (b) another pedestal 115-117. In some examples, the type of upstream communication interface module 210 implemented in a pedestal-based distributor 125 depends on whether the pedestal-based distributor 125 is directly communicatively coupled to the SAI 105. In some examples, the upstream communication interface module 210 of FIG. 2 implements an optical signal transceiver 305 (FIG. 3) when communicatively coupled to the SAI 105, or a bonding communication interface module (FIG. 4) when communicatively coupled to another pedestal 115-117. Alternatively, all pedestal-based distributors 125 implement an upstream communication interface module 210 that bonds together one or more DSL-based and/or Ethernet-based signals transported over respective telephone lines. Example manners of implementing the example upstream communication interface module 210 of FIG. 2 are described below in connection with FIGS. 3 and 4.

To communicatively couple the pedestal-based distributor 125 to a subsequent, next and/or downstream daisy-chained pedestal 115-117 of the example distributed DSLAM 100 of FIG. 1, the example pedestal-based distributor 125 of FIG. 2 includes the example downstream communication interface module 215. The example downstream communication interface module 215 of FIG. 2 implements and bonds together two or more DSL-based and/or Ethernet-based signals transported over respective telephone lines (for example, the example telephone lines 130 and 131 of FIG. 1). An example manner of implementing the example downstream communication interface module 215 is described below in connection with FIG. 4.

To communicatively couple the pedestal-based distributor 125 to one or more customer premises 110 and 111, the example pedestal-based distributor 125 of FIG. 2 includes a transceiver and/or CPE communication interface module 220 for each customer premises 110 and 111 served by the pedestal-based distributor 125. The example communication interface module 220 of FIG. 2 transports user data to and/or from the example customer premises 110 using a DSL-based signal, an Ethernet-based signal, an Integrated Services Digital Network (ISDN) signal, a plain old telephone service (POTS) signal, a digital signal 1 (DS1) signal, etc. via the drop wire 135. Alternatively, the example communication interface module 220 transports user data to the example customer premises 110 using an optical signal over a fiber optic cable 135, and/or via a wireless communication path implemented in accordance with, for example, an IEEE 802.16x (a.k.a., WiMax) technology, a PicoCell technology, a wireless access point technology, and/or a FemtoCell technology. The example CPE communication interface module and/or transceiver 220 of FIG. 2 may be implemented, for example, in accordance with any past, present and/or future standard, specification and/or standard related to the transmission of communication services via fiber optic cables, wires and/or telephone lines, such as any of the ITU-T G.991.x, G.992.x, G.993.x and/or G.998.x families of recommendations, the ITU-T G.984 recommendation, the IEEE 802.3x family of standards, the IEEE 802.16x family of standards, the IEEE 802.15x family of standards, and/or the IEEE 802.3z standard. Additionally or alternatively, the CPE communication interface module 220 implements and/or includes an analog telephone adapter (ATA) to provide a POTS service to a customer premises.

To route data between the communication interface modules 210, 215 and 220, the example pedestal-based distributor 125 of FIG. 2 includes the example Ethernet switch and/or Ethernet hub 205. The example Ethernet switch 205 of FIG. 2 implements an add/drop multiplexer for the example pedestal-based distributor 125. In particular, the example Ethernet switch 205 repeats Ethernet frames and/or packets received via the upstream communication interface module 210 to the downstream communication interface module 215, and repeats Ethernet frames and/or packets received via the downstream communication interface module 215 to the upstream communication interface module 210. The example Ethernet switch 205 adds Ethernet frames and/or data received from the customer premises 110 via the example CPE communication interface module 220 to the Ethernet frames and/or data being transmitted via the upstream communication interface module 210 (for example, received from the downstream communication interface module 215). Likewise, when Ethernet data and/or frames that are addressed to the transceiver 145 at the customer premises 110 are received via the upstream communication interface module 210, the example Ethernet switch 205 routes the received Ethernet data and/or frames to the CO transceiver 220 and does not transmit them via the downstream communication interface module 215.

While an example manner of implementing the example pedestal-based distributors 125 of FIG. 1 has been illustrated in FIG. 2, one or more of the elements, processes and/or devices illustrated in FIG. 2 may be combined, divided, re-arranged, omitted, eliminated and/or implemented in any other way. Further, the example Ethernet switch 205, the example communication interface modules 210, 215 and 220 and/or, more generally, the example pedestal-based distributor 125 of FIG. 2 may be implemented by hardware, software, firmware and/or any combination of hardware, software and/or firmware. Thus, for example, any or all of the example Ethernet switch 205, the example communication interface modules 210, 215 and 220 and/or, more generally, the example pedestal-based distributor 125 may be implemented by one or more device(s), circuit(s), programmable processor(s), ASIC(s), PLD(s) and/or FPLD(s), etc. Further still, a pedestal-based distributor may include one or more elements, processes and/or devices in addition to, or instead of, those illustrated in FIG. 2, and/or may include more than one of any or all of the illustrated elements, processes and devices. For example, if a pedestal-based distributor is coupled to more than one downstream pedestal, the pedestal-based distributor may implement a downstream communication interface module 215 for each downstream pedestal.

Figure 3:
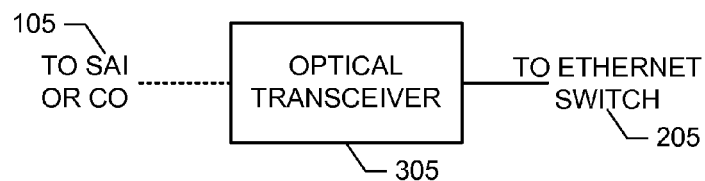
FIG. 3 illustrates an example manner of implementing an upstream communication interface module for the example pedestal-based distributor of FIG. 2.

FIG. 3 illustrates an example manner of implementing the example upstream communication interface module 210 of FIG. 2. To form, generate, create, transmit, receive, decode, and/or transport optical signals via the communication path 120, the example upstream communication interface module 210 of FIG. 3 implements any type of optical transceiver 305. The example optical transceiver 305 of FIG. 3 may be implemented in accordance with any past, present and/or future standard, specification and/or standard related to the transmission of communication services via optical fiber, such as ITU-T G.984 recommendation and/or the IEEE 802.3z standard.

Figure 4:
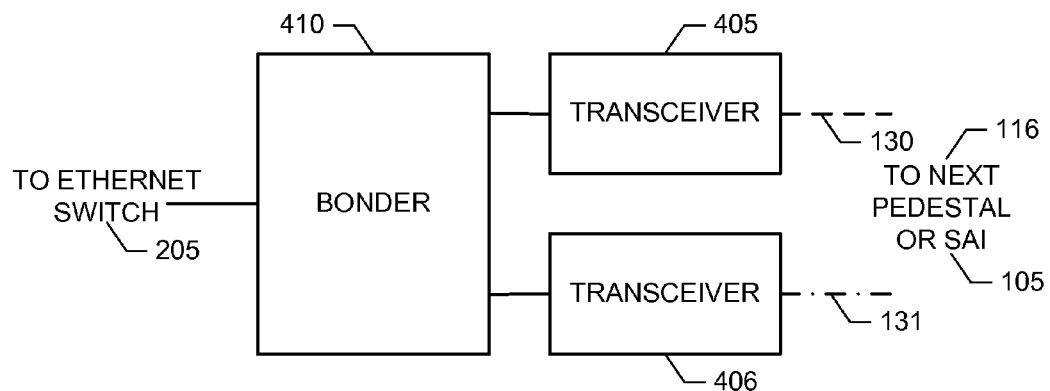
FIG. 4 illustrates an example manner of implementing an upstream communication interface module and/or a downstream communication interface module for the example pedestal-based distributor of FIG. 2.

FIG. 4 illustrates an example manner of implementing the example upstream communication interface module 210 and/or the example downstream communication interface module 215 of FIG. 2. While either of the communication modules 210 and 215 of FIG. 2 can be represented by the example device of FIG. 4, for ease of discussion, the illustrated example of FIG. 4 will be referred to as downstream communication interface module 215. To form, generate, create, transmit, receive, decode, and/or transport DSL-based and/or Ethernet-based signals via two or more wires 130, 131, the example downstream communication interface module 215 of FIG. 4 implements any two or more of any type(s) of transceivers, two of which are designated at reference numerals 405 and 406. The example transceivers 405 and 406 may be implemented in accordance with any past, present and/or future standard, specification and/or standard related to the transmission of communication services via wires and/or telephone lines, such as any of the ITU-T G.991.x, G.992.x, G.993.x and/or G.998.x families of recommendations and/or the IEEE 802.3x family of standards.

To bond together the user data transported over the wires 130 and 131 to form a logical and/or bonded communication path (for example, the example communication path 121 of FIG. 1), the example downstream communication module 215 of FIG. 4 includes a bonder 410. The example bonder 410 of FIG. 4 bonds, aggregates and/or combines user data transported via the wires 130 and 130 at, for example, the MAC and/or data-link layer, to form a logical and/or composite communication path 121 having a transport capability that is substantially the collective data transport capacity of the underlying signal paths 130 and 131. When Ethernet frames and/or packets are received from the example Ethernet switch 205, the example bonder 410 de-multiplexes them to form two or more streams for transmission via respective ones of the transceivers 405 and 406. Likewise, when Ethernet frames and/or packets are received from the transceivers 405 and 406, the example bonder 410 aggregates them together and provides the aggregate as a single stream of Ethernet packets and/or frames to the Ethernet switch 205. The example bonder 410 of FIG. 4 may be implemented in accordance with any past, present and/or future standard, specification and/or standard related to bonding and/or link aggregation, such as any of the ITU-T G.998.x family of recommendations and/or the IEEE 802.3ad standard.

While example manners of implementing the example communication interface modules 210 and 215 of FIG. 2 have been illustrated in FIGS. 3 and 4, one or more of the elements, processes and/or devices illustrated in FIGS. 3 and 4 may be combined, divided, re-arranged, omitted, eliminated and/or implemented in any other way. Further, the example transceivers 305, 405 and 406, the example bonder 410 and/or, more generally, the example communication interface modules 210 and 215 of FIGS. 3 and 4 may be implemented by hardware, software, firmware and/or any combination of hardware, software and/or firmware. Thus, for example, any or all of the example transceivers 305, 405 and 406, the example bonder 410 and/or, more generally, the example communication interface modules 210 and 215 may be implemented by one or more device(s), circuit(s), programmable processor(s), ASIC(s), PLD(s) and/or FPLD(s), etc. Further still, a communication interface module may include one or more elements, processes and/or devices in addition to, or instead of, those illustrated in FIGS. 3 and/or 4, and/or may include more than one of any or all of the illustrated elements, processes and devices.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A distributed digital subscriber line (DSL) access multiplexer (DSLAM) comprising:
    a first distribution cable segment to couple a serving area interface (SAI) to a first pedestal, the first distribution cable segment to transport user data associated with a plurality of subscribers served by the SAI;
    a second distribution cable segment to couple the first pedestal to a second pedestal, the second distribution cable segment to transport a first portion of the user data associated with a first of the plurality of subscribers from the first pedestal to the second pedestal, the second distribution cable segment comprising a pair of DSL-based signals bonded together to form a bonded communication path, the second distribution cable segment different from the first distribution cable segment;
    a drop cable segment to couple the first pedestal to a customer premises, the drop cable segment to transport a second portion of the user data associated with a second of the plurality of subscribers to the customer premises, the drop cable segment different from the first and second distribution cable segments; and
    a switch at the first pedestal to route the first portion of the user data between the first and second distribution cable segments and to route the second portion of the user data between the first distribution cable segment and the drop cable segment.

2. A distributed DSLAM as defined in claim 1, wherein the first distribution cable segment comprises a second pair of DSL-based communication paths bonded together to form a second bonded communication path.

3. A distributed DSLAM as defined in claim 1, wherein the first distribution cable segment comprises an optical fiber.

4. A distributed DSLAM as defined in claim 1, wherein the first switch comprises at least one of an Ethernet switch or an Ethernet hub, and the user data is packetized in accordance with an Ethernet protocol.

5. A distributed DSLAM as defined in claim 1, wherein the drop cable segment is implemented in accordance with at least one of a DSL specification, a DSL standard or a DSL recommendation.

6. A distributed DSLAM as defined in claim 1, wherein the drop cable segment comprises an optical fiber.

7. A distributed DSLAM as defined in claim 1, wherein the drop cable segment is implemented in accordance with an Ethernet protocol.

8. A distributed DSLAM as defined in claim 1, wherein the pair of DSL-based communication paths are implemented in accordance with at least one of a very high-speed DSL (VDSL) specification, a VDSL standard, a VDSL recommendation, a VDSL2 specification, a VDSL2 standard or a VDSL2 recommendation.

9. A distributed DSLAM as defined in claim 1, wherein the pair of DSL-based communication paths are implemented in accordance with at least one of a symmetric DSL (SHDSL) specification, a SHDSL standard or a SHDSL recommendation.

10. A distributed DSLAM as defined in claim 1, further comprising a third distribution cable segment to couple the first pedestal to a third pedestal, the third distribution cable segment to transport a third portion of the user data associated with a third of the plurality of subscribers from the first pedestal to the third pedestal, the third distribution cable segment comprising a second pair of DSL-based signals bonded together to form a second bonded communication path, the third distribution cable segment different from the first and second distribution cable segments.

11. An access network comprising:
  a serving area interface (SAI) to implement communication services for respective ones of a plurality of subscribers;
  a first pedestal comprising:
    a first communication interface module to communicatively couple the first pedestal to the SAI via a first bonded communication path, the first bonded communication path comprising a first pair of bonded communication paths to transport user data associated with the plurality of subscribers served by the SAI;
    a second communication interface module to communicatively couple the first pedestal to a second bonded communication path, the second bonded communication path comprising a second pair of bonded communication paths to transport a first portion of the user data;
    a third communication interface module to communicatively couple the first pedestal to a first customer premises and to transport a second portion of the user data associated with a first of the plurality of subscribers to the first customer premises; and
    a first switch to route the first portion of the user data between the first and second communication interface modules and to route the second portion of the user data between the first and third communication interface modules; and
  a second pedestal comprising:
    a fourth communication interface module to communicatively couple the first pedestal to the second pedestal via the second bonded communication path;
    a fifth communication interface module to communicatively couple the second pedestal to a second customer premises and to transport a third portion of the user data associated with a second of the plurality of subscribers to the second customer premises, the second portion of the user data comprising the third portion of the user data; and
    a second switch to route the third portion of the user data between the fourth and fifth communication interface modules.

12. An access network as defined in claim 11, wherein the first switch comprises at least one of an Ethernet switch or an Ethernet hub, and the user data is packetized in accordance with an Ethernet protocol.

13. An access network as defined in claim 11, wherein the first communication path is implemented in a first distribution cable segment, and the second communication path is implemented in a second distribution cable segment different from the first distribution cable segment.

14. An access network as defined in claim 11, wherein the third communication interface module comprises at least one of very-high speed digital subscriber line (VDSL) transceiver, a VDSL2 transceiver, a symmetric high-speed digital subscriber line (SHDSL) transceiver, an optical transceiver, an Ethernet transceiver, a wireless transceiver or an analog terminal adapter.

15. An access network as defined in claim 11, wherein second pair of bonded communication paths are implemented in accordance with at least one of a very high-speed digital subscriber line (VDSL) specification, a VDSL standard, a VDSL recommendation, a VDSL2 specification, a VDSL2 standard, a VDSL2 recommendation, a symmetric high-speed digital subscriber line (SHDSL) specification, a SHDSL standard or a SHDSL recommendation.

16. An access network as defined in claim 11, wherein second pair of bonded communication paths are implemented in accordance with at least one of an Ethernet specification, an Ethernet standard or an Ethernet recommendation.

17. An access network as defined in claim 11, wherein the first pedestal further comprises a sixth communication interface module to communicatively couple the first pedestal to a third bonded communication path, the third bonded communication path comprising a third pair of bonded communication paths to transport a fourth portion of the user data between the first and a third pedestal.

18. An apparatus comprising:
  a first communication interface module at a first pedestal to receive user data associated with a plurality of subscribers served by a serving area interface (SAI) via a first communication path, the first communication path implemented in a first cable segment;
  a second communication interface module at the first pedestal to transport a first portion of the user data to a second pedestal via a second communication path, the second communication path comprising a pair of communication paths bonded together to form a bonded communication path, the second communication path implemented in a second cable segment different from the first cable segment;
  a third communication interface module at the first pedestal to transport a second portion of the user data associated with a first of the plurality of subscribers to a customer premises; and a switch at the first pedestal to route the first portion of the user data between the first and second communication interface modules and to route the second portion of the user data between the first and third communication interface modules.

19. An apparatus as defined in claim 18, wherein the first communication path comprises a second pair communication paths bonded together to form a second bonded communication path.

20. An apparatus as defined in claim 18, wherein the first communication path comprises an optical communication path.

21. An apparatus as defined in claim 18, wherein the switch comprises at least one of an Ethernet switch or an Ethernet hub, and the user data is packetized in accordance with an Ethernet protocol.

22. An apparatus as defined in claim 18, wherein the second communication interface module comprises:
   a bonder to split the first portion of the user data into a first data stream and a second data stream;
   a first transceiver to transport the first data stream via a first of the pair of bonded communication paths; and
   a second transceiver to transport the second data stream via a second of the pair of bonded communication paths.

23. An apparatus as defined in claim 18, wherein the third communication interface module comprises a very-high speed digital subscriber line (VDSL) transceiver, a VDSL2 transceiver, a symmetric high-speed digital subscriber line (SHDSL) transceiver, an optical transceiver, an Ethernet transceiver, a wireless transceiver or an analog terminal adapter.

24. An apparatus as defined in claim 18, wherein the pair of bonded communication paths are implemented in accordance with at least one of a very high-speed digital subscriber line (VDSL) specification, a VDSL standard, a VDSL recommendation, a VDSL2 specification, a VDSL2 standard, a VDSL2 recommendation a symmetric high-speed digital subscriber line (SHDSL) specification, a SHDSL standard or a SHDSL recommendation.

25. An apparatus as defined in claim 18, wherein the pair of bonded communication paths are implemented in accordance with at least one of an Ethernet standard, an Ethernet specification or an Ethernet recommendation.

26. An apparatus as defined in claim 18, further comprising a fourth communication interface module at the first pedestal to transport a third portion of the user data to a third pedestal via a third communication path, the third communication path comprising a pair of communication paths bonded together to form a bonded communication path, the second communication path implemented in a second cable segment different from the first cable segment.

* * * * *